(12) United States Patent
Oh et al.

(10) Patent No.: US 9,016,777 B2
(45) Date of Patent: Apr. 28, 2015

(54) ARMREST FOR VEHICLE

(71) Applicant: Hyundai Motor Company, Seoul (KR)

(72) Inventors: Man Ju Oh, Gyeonggi-do (KR); Jae Woong Kim, Gyeonggi-do (KR); Jae Woo Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 181 days.

(21) Appl. No.: 13/840,410

(22) Filed: Mar. 15, 2013

(65) Prior Publication Data

US 2014/0175845 A1 Jun. 26, 2014

(30) Foreign Application Priority Data

Dec. 21, 2012 (KR) .......................... 10-2012-0150323

(51) Int. Cl.
| | | |
|---|---|---|
| *A47C 7/72* | (2006.01) | |
| *A47C 31/00* | (2006.01) | |
| *B60N 2/46* | (2006.01) | |
| *B60N 2/44* | (2006.01) | |
| *B60N 2/56* | (2006.01) | |
| B60N 3/00 | (2006.01) | |
| B60N 3/10 | (2006.01) | |

(52) U.S. Cl.
CPC . *B60N 2/468* (2013.01); *B60N 2/46* (2013.01); *B60N 3/00* (2013.01); *B60N 3/10* (2013.01); *B60N 2/44* (2013.01); *B60N 2/5635* (2013.01)

(58) Field of Classification Search
CPC ............ A47C 7/72; A47C 31/00; B60N 3/00; B60N 3/02; B60N 2/46; B60R 7/04
USPC ......................................... 297/180.14, 180.13
See application file for complete search history.

(56) References Cited

U.S. PATENT DOCUMENTS

| | | | | |
|---|---|---|---|---|
| 7,862,113 B2 * | 1/2011 | Knoll | ........................ | 297/180.14 |
| 2004/0068992 A1 * | 4/2004 | Cauchy | .......................... | 62/3.61 |

FOREIGN PATENT DOCUMENTS

| | | |
|---|---|---|
| KR | 10-0164175 | 9/1998 |
| KR | 10-2007-0069058 | 7/2007 |
| KR | 10-2009-0020369 | 2/2009 |
| KR | 10-2009-0062181 | 6/2009 |
| KR | 10-2009-0095192 | 9/2009 |
| KR | 10-2012-0066212 | 6/2012 |
| KR | 10-2012-0100574 | 9/2012 |

\* cited by examiner

*Primary Examiner* — Syed A Islam
(74) *Attorney, Agent, or Firm* — Mintz Levin Cohn Ferris Glovsky and Popeo, P.C.; Peter F. Corless

(57) ABSTRACT

The present invention relates to an armrest for a vehicle. The armrest includes: an intake port which is formed in a front surface of a front end of an armrest body; an exhaust port which is formed in a rear end of the armrest body; a blower which is installed in the armrest body and connected to the intake port by an intake duct; a plurality of cup holders which are arranged in a row above the intake duct; an exhaust duct which extends from the blower and branching off into a plurality of diverged parts that pass by the respective cup holders and are connected to the exhaust port; and a thermoelement which is provided on each of the cup holders and is brought into close contact with the exhaust duct.

15 Claims, 3 Drawing Sheets

ARMREST FOR VEHICLE

CROSS-REFERENCE TO RELATED APPLICATION

This application claims under 35 U.S.C. §119(a) the benefit of Korean Patent Application No. 10-2012-0150323, filed on Dec. 21, 2012 in the Korean Intellectual Property Office, the disclosure of which is incorporated herein in its entirety by reference.

BACKGROUND OF THE INVENTION

1. Field of the Invention

The present invention relates to an armrest for vehicles. More particularly, the present invention relates to an armrest that provides cooling and heating functions.

2. Description of the Related Art

Recently, vehicle cup holders having cooling and heating functions have been extensively researched and installed in vehicles. Such cup holders are typically provided with thermoelements that use electrical energy to provide two kinds of functions, including cooling and heating functions. However, to date, there are no commercially viable techniques for effectively mounting cup holders in vehicles and efficiently providing cooling and heating systems for the cup holders.

A representative example of a conventional technique for an armrest with cooling and heating functions proposed a cooling and heating box for vehicles, which has enhanced cooling and heating efficiency. In detail, the cooling and heating box for vehicles according to this technique is provided with thermoelements. A first surface of each thermoelement is mounted to the perimeter of the bottom of the box. A duct is disposed adjacent to second surfaces of the thermoelements so that when the thermoelements are operated, heat generated from the second surfaces of the thermoelements is exhausted to the outside through the duct. Furthermore, the cooling and heating box further includes a control unit which controls the thermoelements such that when it is desired to use the box as a heating box, the thermoelements are connected in parallel to each other, and when it is desired to use the box as a cooling box, the thermoelements are connected in series to each other. Thereby, when the box is used both as a heating box and as a cooling box, the efficiency can be enhanced. Unfortunately, this conventional technique is cannot be optimized for use as an armrest of a rear seat.

Furthermore, it should be noted that the description provided above is merely for aiding in understanding the background of the present invention, and should not be construed as admitted prior art.

SUMMARY OF THE INVENTION

The present invention has been made in an effort to solve the above-described problems, and it is an object of the present invention to provide an armrest for a vehicle with a cup holder having cooling and heating functions, thus enhancing the marketability of the vehicle. The armrest of the present invention is configured such that a thermoelement and an air-conditioning line are provided and effectively arranged so as to provide both cooling and heating functions, while still allowing the armrest to function as a seat back when retracted into a rear seat. Another object of the present invention is to provide an armrest for a vehicle that is designed so that a pair of cup holders may be installed in the armrest in a side by side configuration, even while maintaining a comparatively narrow armrest width.

In order to accomplish the above objects, the present invention provides an armrest for a vehicle, including: an intake port formed in a front surface of a front end of an armrest body; an exhaust port formed in a rear end of the armrest body; a blower installed in the armrest body and connected to the intake port by an intake duct; a plurality of cup holders arranged in a row above the intake duct; an exhaust duct extending from the blower and branching off into a plurality of diverged parts passing by the respective cup holders, the plurality of parts being connected to the exhaust port; and a thermoelement provided on each of the cup holders, the thermoelement being brought into close contact with the exhaust duct.

The exhaust port may comprise a plurality of exhaust ports formed in the rear end of the armrest body and connected to the respective diverged parts of the exhaust duct. The intake port may be formed in a lower portion of the front surface of the front end of the armrest body. The intake duct may extend rearwards from the intake port, wherein the intake duct longitudinally passes through a lower portion of the armrest body and is connected to the blower. The cup holders may comprise a pair of cup holders arranged above the intake duct in a row in a lateral direction of the armrest body (e.g., a side by side configuration).

The exhaust duct may extend from the blower and branch off to opposite sides to form diverged ducts, each of the diverged ducts may extend rearwards via the corresponding cup holder and be connected to the exhaust port.

The intake duct may be connected to a lower end of the blower, and the exhaust duct may be horizontally connected to the blower so that the blower intakes air vertically and discharge the air horizontally.

The cup holders may be disposed in the front end of the armrest body, and the blower may be disposed in the rear end of the armrest body.

A grill may be provided on the intake port to prevent a foreign substance from being drawn into the intake port.

The exhaust port may communicate with the outside of a passenger compartment of the vehicle.

The thermoelement may include a cooling surface in close contact with the corresponding cup holder, and a heat radiation surface in close contact with the exhaust duct.

A heat exchange part may be provided in the exhaust duct, the heat exchange part being in close contact with the heat radiation surface of the thermoelement.

The armrest body may be filled with a filler, wherein the filler has a space through which the intake port and/or the exhaust port is connected to the blower, the space forming the intake duct or the exhaust duct. The exhaust port may be formed in a rear surface of the rear end of the armrest body at a position spaced apart from a lower end of the armrest body by a predetermined distance.

The armrest may further include a bellows-shaped external duct extending from the exhaust port to an area outside of a passenger compartment of the vehicle.

As described above, in an armrest for a vehicle according to the present invention, a cup holder having cooling and heating functions can be installed in the armrest, thus further enhancing the marketability of high-class vehicles. Particularly, the armrest can be designed such that a pair of cup holders can be sufficiently installed in the armrest even though the width of the armrest is comparatively small. Furthermore, a thermoelement and an air-conditioning line which are provided to realize the cooling and heating functions are effectively arranged so that the cooling and heating performances can be reliably ensured.

Moreover, in the present invention, when the armrest is retracted into a seat to function as a seatback, it can provide comfort and ensure safety even in the event that a vehicle accident occurs, thus further enhancing the marketability of the vehicle.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an armrest for vehicles according to a preferred embodiment of the present invention will be described in detail with reference to the attached drawings.

Figure 1:
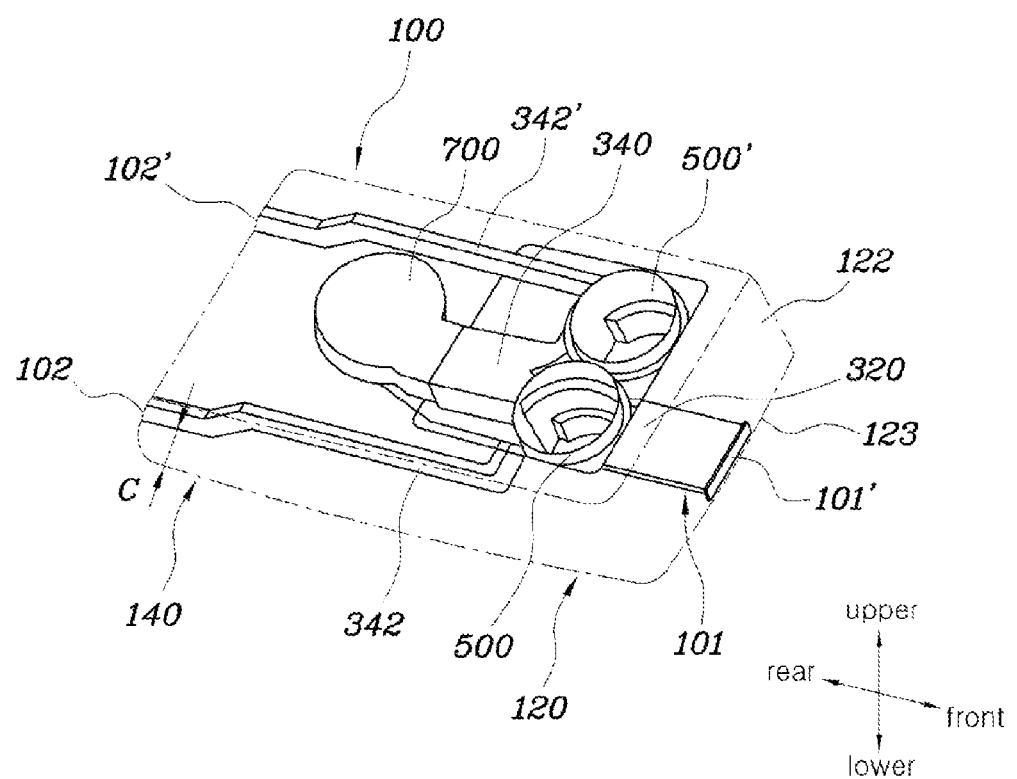
FIG. 1 is a perspective view of an armrest for vehicles, according to an exemplary embodiment of the present invention.
Figure 2:
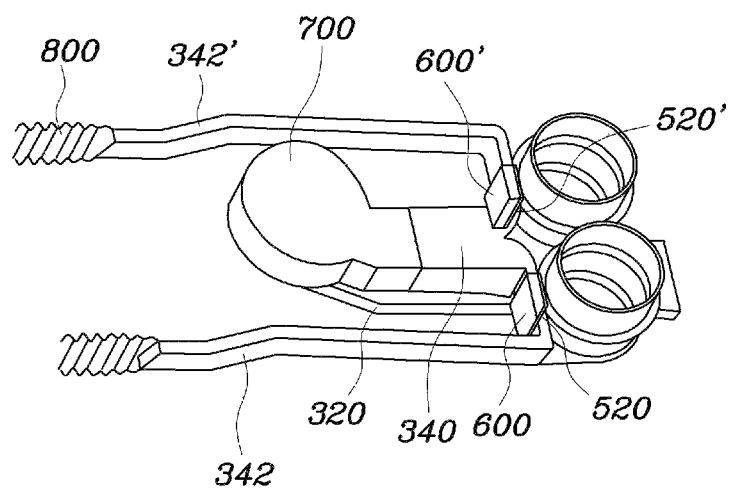
FIG. 2 is a perspective view showing an important portion of the armrest of FIG. 1.

FIG. 1 is a perspective view of an armrest for vehicles according to an exemplary embodiment of the present invention, and FIG. 2 is a perspective view showing an important portion of the armrest of FIG. 1.

As shown in FIGS. 1 and 2, the armrest according to an exemplary embodiment of the present invention includes an intake port 101, an exhaust port 102, a blower 700, a plurality of cup holders 500, an exhaust duct 340 and thermoelements 520. The intake port 101 may be formed in a front surface of a front end of an armrest body 100. The exhaust port 102 may be formed in a rear end of the armrest body 100. The blower 700 may be installed in the armrest body 100 and connected to the intake port 101 by an intake duct 320. The cup holders 500 are arranged in a row above the intake duct 320. In an exemplary embodiment, the cup holders 500 may be arranged in a side by side configuration. The exhaust duct 340 extends from the blower 700 and branches off into a plurality of parts which pass by the respective cup holders 500 and are connected to the exhaust port 102. The thermoelements 520 are provided on the respective cup holders 500 and are brought into close contact with the exhaust duct 340.

The armrest of the present invention may function as a typical armrest or, alternatively, as a seatback. That is, the armrest body 100 has a rotating shaft in the rear end thereof pivotally connected to the seat in which the armrest is housed. Depending on the rotation of the armrest body 100 around the rotating shaft, when the armrest body 100 is folded and retracted into a seat, the armrest functions as a seatback and, when the armrest body 100 is unfolded from the seat, it functions as an armrest provided with the cooling or heating cup holders 500.

In the case where the armrest is provided in a three-seater rear seat, the armrest must be able to be retracted into the seat and function as a seat back for a middle occupant. Given this, the armrest must be designed such that a system of an internal air-conditioning line and elements that are exposed to the outside do not hinder the function as the seatback.

The intake port 101 and the exhaust port 102 may be formed in the armrest to provide cooling and heating functions of the cup holders 500. The intake port 101 is a passage through which air is drawn from a passenger compartment into the armrest. Air containing waste heat that has been used for heat exchange is discharged from the armrest through the exhaust port 102. The layout of the intake port 101 and the exhaust port 102 is important.

In the embodiment of the present invention, the intake port 101 may be formed in the front surface or upper surface of the front end of the armrest body 100 so that, when the armrest body 100 is retracted into the seat, the intake port 101 is prevented from being exposed to the outside. That is, if the intake port 101 is exposed to the outside when the armrest is retracted into the seat to function as a seatback rather than being extracted from the seat, it may make the occupant uncomfortable while the armrest is supporting him/her, and if the occupant collides with the armrest, the intake port 101 may become a safety hazard, causing direct contact between it and the occupant.

Therefore, in consideration of comfort and safety, the intake port 101 may be disposed at a location at which it can be prevented from being exposed to the outside (e.g., an exposed surface of the armrest) when the armrest is functioning as a seat back while it is allowed to be exposed to the outside when the armrest is extracted to function as an armrest. For this, the intake port 101 may be disposed in the front surface 122 or the upper surface 124 of the front end 120 of the armrest body 100 rather than in a lower surface of the front end 120, whereby when the armrest is retracted into the seat to function as a seat back, the intake port 101 can be prevented from being exposed to the outside by virtue of being shielded by the seat in which it is retracted.

Meanwhile, the exhaust port 102 may be formed in a rear end 140 of the armrest body 100. Particularly, the exhaust port 102 may be formed in a rear surface of the rear end 140 so that it can communicate with the outside of the passenger compartment. A bellows-shaped external duct 800 extends from the exhaust port 102 to the outside of the passenger compartment. Air containing waste heat that has been used for heat exchanger may be exhausted out of the passenger compartment so as to maintain air-conditioning efficiency of the passenger compartment. Specifically, the bellows-shaped external duct 800 may be used to exhaust the air to space below the vehicle or into the trunk. Thereby, when the armrest is retracted into or extracted from the seat, an air passage can be prevented from being blocked.

The exhaust port 102 may be formed in the rear surface of the rear end of the armrest body 100 at a position spaced apart from a lower end of the armrest body 100 by a predetermined distance, so that even when the armrest is retracted into the seat, the external duct 800 may be prevented from being blocked or folded and permanently damaged.

Figure 3:
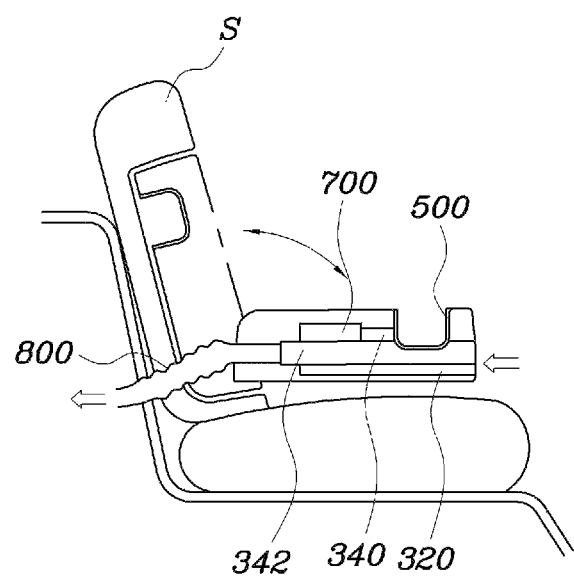
FIG. 3 is a view showing the operation of the armrest of FIG. 1.

FIG. 3 is a view showing the operation of the armrest of FIG. 1. As shown in FIG. 3, when the armrest is extracted from the seat, it functions as an armrest and a cup holder. When the armrest is retracted into the seat, it functions as a seatback of a center rear seat. Waste heat that has been used for heat exchange is exhausted into the trunk of the vehicle, or the like, by the external duct 800.

Meanwhile, in the case of the armrest having the above-mentioned construction, it is necessary to increase the efficiency of an internal air-conditioning system for cooling or heating the cup holder. On the other hand, noise or vibrations resulting from the operation must be reduced as much as possible. That is, to make the cup holders of the armrest reliably conduct the cooling or heating function, a duct, a blower and a thermoelement may be required. However, if the duct or the blower is disposed in such a way that flow resistance is significantly increased, noise and vibrations are caused. Particularly, because the armrest is a place on which a user puts his/her arm, the user may feel unpleasantness despite a small noise or vibration. Therefore, an internal system layout must be designed such that the flow resistance can be reduced as much as possible.

For this, in the present invention, the intake port 101 may be formed in the front surface of the front end of the armrest body 100 so that air in the passenger compartment is drawn into the intake port 101 by blower 700. Waste heat may be collected after air-conditioning has been completed. The exhaust port 102 may be formed in the rear end of the armrest body 100 so that the waste heat is exhausted from the exhaust port 102 into the trunk area or the like.

The cup holders 500 may be installed in the armrest body 100 and are arranged in a row above the intake duct 320. Particularly, a heat exchange part is disposed behind the cup holders 500 so that there is no empty space between the cup holders. Therefore, even though the width of the armrest is comparatively small, the two cup holders may be arranged in a row with respect to the lateral direction. The blower 700 is connected to the intake port 101 by the intake duct 320 to control the intake and exhaust of air. The exhaust duct 340 extends from the blower 700 and branches off into two parts which pass through the respective cup holders 500 and are connected to the exhaust port 102 so that the intake port 101 and the exhaust port 102 are in fluid communication with one another. The thermoelements 520 are provided on the respective cup holders 500 and are brought into close contact with the exhaust duct 340.

In the present invention, a Peltier module is used as each thermoelement 520. Basically, the Peltier module includes a cooling surface and a heat radiation surface, and functions as a heat pump which transfers heat from one side to the other side when electricity is applied thereto. The thermoelements which function as the heat exchange part are disposed behind the cup holders. Therefore, the two cup holders and the two thermoelements can be sufficiently installed in the armrest even if the width of the armrest is comparatively small.

In an exemplary embodiment, the exhaust port 102 comprises a plurality of exhaust ports 102 which are provided in the rear end of the armrest body 100 and connected to the respective diverged parts of the exhaust duct 340. The intake port 101 is disposed in a lower portion of the front surface of the front end of the armrest body 100.

As shown in the drawings, the intake duct 320 may be disposed below the cup holders 500 so that the cup holders 500 can be as wide as possible. The exhaust duct 340 that extends from the blower 700 branches off into two parts behind the cup holders 500. The diverged parts of the exhaust duct 340 come into contact with the respective cup holders 500 and extend rearwards to the rear end of the armrest body 100. Therefore, the two cup holders can be sufficiently installed in the armrest even though the width of the armrest is comparatively small.

The intake duct 320 extends rearwards from the intake port 101. In this embodiment, the intake duct 320 longitudinally passes through a lower portion of the armrest body 100 before being connected to the blower 700. The two cup holders 500 are disposed above the intake duct 320 and are arranged in a row in the lateral direction of the armrest body 100.

The exhaust duct 340 that extends from the blower 700 branches into two parts to form diverged ducts 342. Each diverged duct 342 extends rearwards via the corresponding cup holder 500 and is connected to the corresponding exhaust port 102.

The intake duct 320 is connected to a lower end of the blower 700, and the exhaust duct 340 is horizontally connected to the blower 700 so that the blower 700 can vertically take in air and discharge it horizontally. In other words, an air passage may be configured such that it is bent at a right angle based on the blower 700, thus facilitating the intake and exhaust flow of the blower 700, and avoiding a problem of flow resistance being increased by mixture of intake air and exhaust air. In other words, this structure can prevent a problem of flow resistance being increased in the blower 700 by mixture of the intake air and the exhaust air which may be induced when intake air pressure and exhaust air pressure are abnormal because the pressure of the passenger compartment is different from that of the exterior of the vehicle.

The cup holders 500 are disposed in the front end of the armrest body 100, and the blower 700 is installed in the rear end of the armrest body 100. Thus, the user can easily put a cup into either of the cup holders 500 and comfortably support his/her elbow on the armrest. A grill 101' is provided on the intake port 101 to prevent foreign substances from being drawn into the intake port 101.

Meanwhile, the exhaust ports 102 communicate with the outside of the passenger compartment of the vehicle. The bellows-shaped external duct 800 extends from the exhaust ports 102 to the outside of the passenger compartment of the vehicle. Air containing waste heat that has been used for heat exchange is exhausted to the outside of the passenger compartment through the bellows-shaped external duct 800 so that the air-conditioning efficiency of the passenger compartment can be maintained Particularly, in the present invention, the bellows-shaped external duct 800 is used to exhaust the air to a space below the vehicle or into the trunk. Thereby, when the armrest is retracted into, or extracted from, the seat, the air passage can be prevented from being blocked.

The cooling surface of the thermoelement 520 may be brought into close contact with the cup holder 500, and the heat radiation surface thereof is brought into close contact with the exhaust duct 340. Heat exchange parts 600 which are brought into close contact with the heat radiation surfaces of the respective thermoelements 520 are provided in the exhaust duct 340. According to this exemplary embodiment, the two cup holders may be sufficiently installed even in the armrest that is comparatively narrow.

Furthermore, the armrest body 100 may be filled with a filler. The filler has spaces through which the intake port 101 and the exhaust ports 102 are connected to the blower 700, thus respectively forming the intake duct 320 and the exhaust ducts 340. This structure can avoid problems which may result from installation of a separate duct in the armrest body 100, for example, an increase in weight, a sense of difference in operation of the armrest, the possibility of the duct striking a person in the vehicle when an accident occurs, generation of noise when the vehicle travels on a rough road, etc.

The exhaust ports 102 are formed in the rear surface of the rear end of the armrest body 100 at positions spaced apart from the lower end of the armrest body 100 by a predetermined distance. As stated above, the bellows-shaped external ducts 800 extend from the respective exhaust ports 102 to the outside of the passenger compartment of the vehicle.

As described above, in an armrest for vehicles according to the present invention, a cup holder which has cooling and heating functions is installed in the armrest, thus enhancing the marketability of high-class vehicles. Particularly, the armrest can be designed such that a pair of cup holders can be sufficiently installed in the armrest even though the width of the armrest is comparatively small (e.g., in a side by side or front to back configuration). Therefore, the marketability of a product can be markedly improved. Furthermore, a thermoelement and an air-conditioning line which are provided to realize the cooling and heating functions are effectively arranged so that the cooling and heating performances can be reliably ensured. Moreover, in the present invention, when the armrest is retracted into a seat to function as a seatback, it can provide comfort and ensure safety even when a vehicle accident occurs, thus further enhancing marketability.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An armrest for a vehicle, comprising:
    an armrest body having a front end, a rear end, and two sides;
    an intake port formed in a front surface of the front end of the armrest body;
    an exhaust port formed in the rear end of the armrest body;
    a blower installed in the armrest body and connected to the intake port by an intake duct;
    a plurality of cup holders arranged in a row above the intake duct;
    an exhaust duct extending from the blower and branching off into a plurality of diverged parts passing by the respective cup holders, the plurality of parts being connected to the exhaust port; and
    a thermoelement provided on each of the cup holders, the thermoelement being brought into close contact with the exhaust duct.

2. The armrest as set forth in claim 1, wherein the exhaust port comprises a plurality of exhaust ports formed in the rear end of the armrest body and connected to the respective diverged parts of the exhaust duct.

3. The armrest of claim 1, wherein the intake port is formed in a lower portion of the front surface of the front end of the armrest body.

4. The armrest of claim 3, wherein the intake duct extends rearwards from the intake port and longitudinally passes through a lower portion of the armrest body and is connected to the blower.

5. The armrest of claim 1, wherein the cup holders comprise a pair of cup holders arranged above the intake duct in a row in a lateral direction of the armrest body.

6. The armrest of claim 5, wherein the exhaust duct extends from the blower and branches off to opposite sides to form diverged ducts, each of the diverged ducts extending rearwards via the corresponding cup holder and being connected to the exhaust port.

7. The armrest of claim 1, wherein the intake duct is connected to a lower end of the blower, and the exhaust duct is horizontally connected to the blower so that the blower intakes air vertically and discharge the air horizontally.

8. The armrest of claim 1, wherein the cup holders are disposed in the front end of the armrest body, and the blower is disposed in the rear end of the armrest body.

9. The armrest of claim 1, wherein a grill is provided on the intake port to prevent a foreign substance from being drawn into the intake port.

10. The armrest of claim 1, wherein the exhaust port communicates with an area outside of a passenger compartment of the vehicle.

11. The armrest of claim 1, wherein the thermoelement comprises a cooling surface in close contact with the corresponding cup holder, and a heat radiation surface in close contact with the exhaust duct.

12. The armrest of claim 11, wherein a heat exchange part is provided in the exhaust duct, the heat exchange part being in close contact with the heat radiation surface of the thermoelement.

13. The armrest of claim 1, wherein the armrest body is filled with a filler, wherein the filler has a space through which the intake port or the exhaust port is connected to the blower, the space forming the intake duct or the exhaust duct.

14. The armrest of claim 1, wherein the exhaust port is formed in a rear surface of the rear end of the armrest body at a position spaced apart from a lower end of the armrest body by a predetermined distance.

15. The armrest as set forth in claim 1, further comprising a bellows-shaped external duct extending from the exhaust port to an outside of a passenger compartment of the vehicle.

* * * * *